(12) United States Patent
Sato et al.

(10) Patent No.: US 11,524,659 B2
(45) Date of Patent: Dec. 13, 2022

(54) CLEANING DEVICE

(71) Applicant: MURAKAMI CORPORATION, Shizuoka (JP)

(72) Inventors: Hidenori Sato, Shizuoka (JP); Futoshi Suzuki, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 285 days.

(21) Appl. No.: 16/494,383

(22) PCT Filed: Jan. 29, 2018

(86) PCT No.: PCT/JP2018/002768
§ 371 (c)(1),
(2) Date: Sep. 16, 2019

(87) PCT Pub. No.: WO2018/173486
PCT Pub. Date: Sep. 27, 2018

(65) Prior Publication Data
US 2020/0047718 A1 Feb. 13, 2020

(30) Foreign Application Priority Data
Mar. 24, 2017 (JP) .............................. JP2017-059502

(51) Int. Cl.
*B60S 1/56* (2006.01)
*B60R 1/00* (2022.01)
(Continued)

(52) U.S. Cl.
CPC .................. *B60S 1/56* (2013.01); *B60R 1/00* (2013.01); *B60S 1/02* (2013.01); *H04N 5/225* (2013.01)

(58) Field of Classification Search
CPC ........... B60S 1/56; B60R 1/00; B60R 1/0602; H04N 5/225; G02B 27/0006
(Continued)

(56) References Cited

U.S. PATENT DOCUMENTS

2015/0185428 A1* 7/2015 Tani ....................... G02B 1/045
428/373
2015/0344001 A1* 12/2015 Lopez Galera ........... B60S 1/56
134/198

(Continued)

FOREIGN PATENT DOCUMENTS

| CN | 101846084 | 9/2010 |
|---|---|---|
| CN | 203305971 | 11/2013 |

(Continued)

OTHER PUBLICATIONS

International Search Report issued in International Patent Application No. PCT/JP2018/002768 dated Apr. 3, 2018.
(Continued)

*Primary Examiner* — Rebecca A Volentine
*Assistant Examiner* — Jimmy S Lee
(74) *Attorney, Agent, or Firm* — Greenblum & Bernstein, P.L.C.

(57) ABSTRACT

A cleaning device according to an embodiment is a cleaning device that cleans a light transmission member provided on a camera. The cleaning device includes a filamentary member configured to contact the light transmission member and a rotation member configured to rotate the filamentary member such that the filamentary member moves along the surface of the light transmission member with the filamentary member in contact with the light transmission member.

20 Claims, 10 Drawing Sheets

(51) Int. Cl.
 *H04N 5/225* (2006.01)
 *B60S 1/02* (2006.01)
(58) Field of Classification Search
 USPC ...................................................... 15/250.22
 See application file for complete search history.

(56) References Cited

U.S. PATENT DOCUMENTS

2016/0167092 A1\* 6/2016 Gaw ..................... B08B 6/00
                                                          15/1.51
2017/0210351 A1\* 7/2017 Ghannam ................. B60S 1/50

FOREIGN PATENT DOCUMENTS

| JP | 57-174260   | 11/1982 |
|----|-------------|---------|
| JP | 9-175339    | 7/1997  |
| JP | 2013-081097 | 5/2013  |
| JP | 2014-125104 | 7/2014  |
| JP | 2017-170303 | 9/2017  |

OTHER PUBLICATIONS

International Preliminary Report on Patentability issued in International Patent Application No. PCT/JP2018/002768 dated Sep. 24, 2019.

\* cited by examiner

CLEANING DEVICE

TECHNICAL FIELD

The present disclosure relates to a cleaning device provided on a camera.

BACKGROUND ART

There is conventionally known a cleaning device that cleans a light transmission member, such as a camera lens. Japanese Unexamined Patent Publication No. 2014-125104 describes a deposit wiping device that cleans a camera device mounted on a vehicle traveling in the outdoor environment. The deposit wiping device includes a wiper arm rockingly mounted on the housing of the camera device. The wiper arm has an arm main body and a wiper blade mounted on the arm main body.

The wiper blade is disposed above the lens of the camera device, and formed in an arc shape along the lens surface. The wiper blade is pressed against the lens surface with a constant pressing force when the wiper arm is rocked. The wiper blade is made of rubber having elasticity or a silicon resin. The wiper arm is rocked with the wiper blade pressed against the lens surface as described above, and hence deposits attached to the lens are wiped.

CITATION LIST

Patent Literature

Patent Literature 1: Japanese Unexamined Patent Publication No. 2014-125104

SUMMARY OF INVENTION

Technical Problem

In the above-descried deposit wiping device, the wiper blade is in a plate shape. This wiper blade reciprocates over the lens, and hence deposits are wiped. In the deposit wiping device, the reflection of the wiper blade is projected onto an image captured by the camera device when the deposits are wiped to clean the lens. Therefore, a problem can be arise in that a captured image is not seen in cleaning the lens. Thus, the above-descried deposit wiping device fails to be used during driving a vehicle, for example. That is, the timing at which the deposit wiping device can be used is limited, and hence the deposit wiping device has a room to improve on the point of usability.

The above-described deposit wiping device cleans the lens by rocking the wiper arm. In the case in which cleaning is performed by rocking the wiper arm in this manner, under present circumstances, an increase in the speed of rocking the wiper arm is not enabled, and hence no efficient cleaning can be performed.

An object of the present disclosure is to provide a cleaning device that can avoid a problem that a captured image is not seen in cleaning to improve usability as well as can perform efficient cleaning.

Solution to Problem

A cleaning device according to the present disclosure is a cleaning device that cleans a light transmission member provided on a camera, the cleaning device including a filamentary member configured to contact the light transmission member and a rotation member configured to rotate the filamentary member such that the filamentary member moves along the surface of the light transmission member with the filamentary member in contact with the light transmission member.

This cleaning device includes the filamentary member configured to contact the light transmission member of the camera. The light transmission member is cleaned with the filamentary member rotated in contact with the light transmission member. Thus, the filamentary member scrapes, for example, deposits for cleaning, and hence cleaning can be performed with a thin filamentary member. Therefore, it can be restrained that the reflection of the filamentary member is projected onto an image captured by the camera, and hence cleaning can be performed even though the camera is being used. Thus, the timing at which the cleaning device is used is not limited, and hence usability can be enhanced. In the cleaning device, the rotation member rotates the filamentary member to clean the light transmission member. Therefore, the filamentary member can be easily rotated at high speed, compared with the case in which a wiper blade or any other member is rocked. Consequently, deposits on the light transmission member can be efficiently scraped by a high-speed rotation of the filamentary member. Thus, the light transmission member can be efficiently cleaned.

The rotation member is in a ring shape, the filamentary member is held on the rotation member, and a drive unit configured to rotate the rotation member may be included. In this case, the drive unit rotates the rotation member, and hence the filamentary member held on the rotation member can be rotated on the light transmission member. Therefore, the filamentary member is rotated by the driving force of the drive unit, and hence the surface of the light transmission member can be cleaned.

The rotation member may rotate the filamentary member by reception of a water stream. In the case in which the filamentary member is rotated by a water stream as described above, a drive unit configured to rotate the filamentary member, such as a motor, can be eliminated. Therefore, the cleaning device can be made lightweight as well as the configuration of the cleaning device can be simplified.

The thickness of the filamentary member may be 0.01 mm or more and 0.10 mm or less. The thickness of the filamentary member is 0.10 mm or less, and hence the filamentary member can be made thin. Thus, the reflection of the filamentary member can be further not easily projected onto an image captured by the camera. The thickness of the filamentary member is 0.01 mm or more, and hence the filamentary member can be not easily cut, and the strength of the filamentary member can be surely secured.

The above-described cleaning device may include an elastic part provided between the filamentary member and the rotation member. In this case, the filamentary member is connected to the rotation member through the elastic part. Thus, in the case in which the light transmission member is curved in a convex shape, the filamentary member can be brought into contact with the light transmission member by deforming the elastic part. As described above, the elastic part can be deformed in the disposition of the filamentary member on the light transmission member, and hence it is enabled that the force applied to the filamentary member is reduced to restrain cutting the filamentary member. Therefore, cutting the filamentary member can be avoided even through the filamentary member is disposed on light transmission members in various shapes, and hence the versatility of the cleaning device can be enhanced.

The filamentary member and the rotation member may be attachable to and detachable from the light transmission member. In this case, the filamentary member and the rotation member can be replaced from the light transmission member. Therefore, the maintenance properties of the cleaning device can be enhanced.

The filamentary member may be black. In this case, the light reflection from the filamentary member can be restrained. Therefore, a problem that an image captured by the camera is not clear due to reflected light beams from the filamentary member can be restrained.

The filamentary member contacts the light transmission member with the filamentary member pulled, and the tension load of the filamentary member may be 0.2 N or more and 1.5 N or less. The tension load of the filamentary member is 0.2 N or more, and hence it is enabled that the pressing force of the filamentary member against the light transmission member is increased to further efficiently scrape deposits on the light transmission member. The tension load of the filamentary member is 1.5 N or less, and hence the abrasion of the filamentary member can be restrained.

The filamentary member may be provided at the position displaced from the focal point of the light transmission member. In this case, the filamentary member is disposed at the position displaced from the focal point of the light transmission member, and hence it can be further surely avoided that the reflection of the filamentary member is projected onto an image captured by the camera.

Advantageous Effects of Invention

According to the present disclosure, a problem that a captured image is not seen in cleaning can be avoided to improve usability as well as efficient cleaning can be performed.

DESCRIPTION OF EMBODIMENTS

In the following, embodiments of a cleaning device according to the present disclosure will be described with reference to the drawings. In the description of the drawings, the same or corresponding elements are designated with the same reference signs, and the duplicate description is appropriately omitted. In the present specification, the term "light transmission member" indicates a component through which a light beam is transmitted. Typically, a lens or a filter is named. The term "filamentary member" indicates a member linearly extending in one direction. Typically, a thread or a wire is named. The term "elastic part" indicates a portion or a member of high elasticity and deformable, and rubber or a spring is named. The term "black" includes black as well as dark blue with coloration close to black, purple, brown, gray, and dark green. The term "water stream" indicates a flow of a liquid including water, such as pure water and a cleaning fluid including water.

First Embodiment

Figure 1:
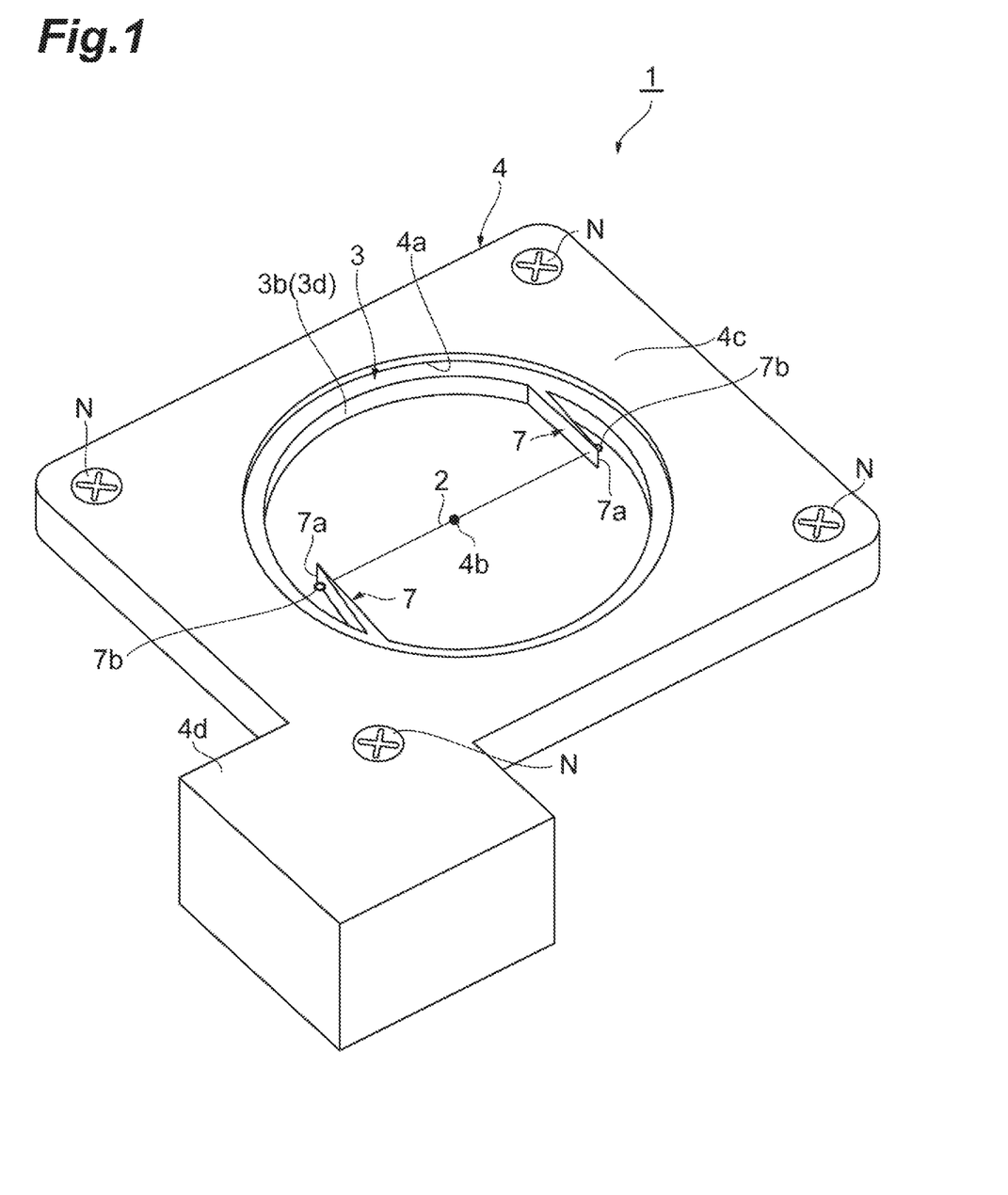
FIG. 1 is a perspective view showing a cleaning device according to a first embodiment.
Figure 2:
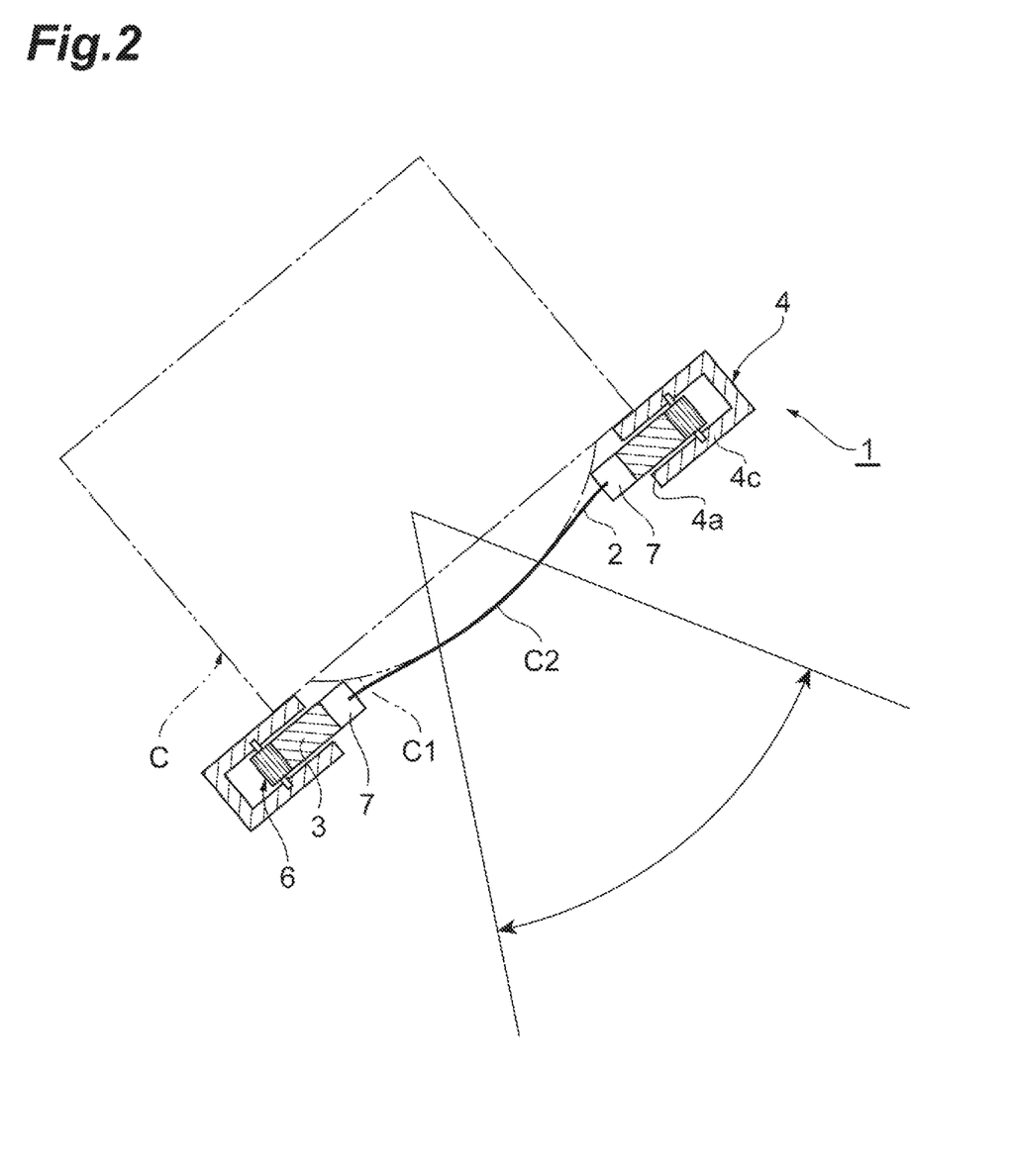
FIG. 2 is a cross sectional view showing the cleaning device in FIG. 1 and a camera.
Figure 3:
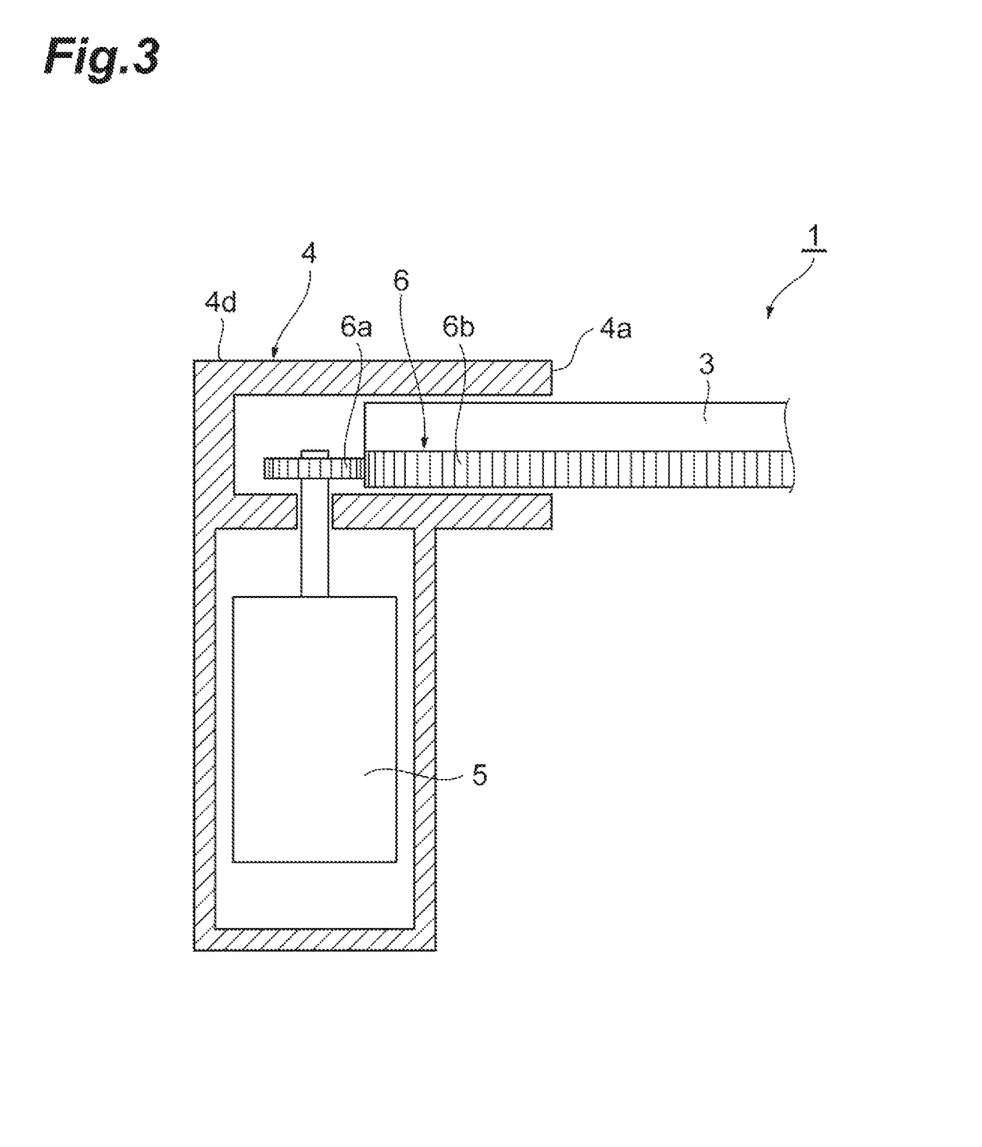
FIG. 3 is a cross sectional view showing the motor and the gear of the cleaning device in FIG. 1.

As shown in FIGS. 1, 2, and 3, a cleaning device 1 according to the embodiment is a cleaning device that physically cleans a lens C1 that is the light transmission member of the camera C. The cleaning device 1 includes, as an appearance configuration, a filamentary member 2 configured to contact the surface of the lens C1, a rotation member 3 provided with an elastic part 7 configured to elastically hold the filamentary member 2 at both ends of the filamentary member 2, and a housing 4 configured to rotatably hold the rotation member 3. The cleaning device 1 includes a motor 5 configured to rotation-drive the rotation member 3 and a gear group 6 configured to transmit the driving force of the motor 5 to the rotation member 3 in the inside of the housing 4.

The housing 4 forms a rectangle on the whole. The housing 4 has an opening 4a from which the filamentary member 2 and the rotation member 3 are exposed. The opening 4a is in a circular shape in which at least the filamentary member 2 and the interior portion of the rotation member 3, for example, are exposed. The housing 4 is attachably and detachably mounted on the camera C such that a center 4b of the opening 4a in a circular shape is matched with a center C2 of the lens C1. Thus, the filamentary member 2 and the rotation member 3 are attachable to and detachable from the lens C1.

The camera C is a camera provided on a vehicle, for example, and the lens C1 of the camera C is directed to the rear diagonal of the vehicle. Note that the orientation of the lens C1 is not limited to the rear diagonal of the vehicle, and can be appropriately modified. The camera C configures the camera monitor system of the vehicle, which is provided instead of a rearview mirror as an example. This camera monitor system includes the camera C and a monitor configured to display an image captured by the camera C in the inside of the vehicle.

As described above, the camera C is provided on the vehicle. Thus, it is assumed that deposits, such as mud, are attached to the lens C1 when mud is splashed in the travel of a vehicle, or when it rains or snows. The cleaning device 1 scrapes deposits attached to the surface of the lens C1 for cleaning. The cleaning device 1 performs cleaning in response to manipulations by a driver on the vehicle, for example. However, the cleaning device 1 may automatically perform cleaning when the definition of the image captured by the camera C is reduced due to deposits.

The housing 4 includes a rotation member holding part 4c in a rectangular plate shape having the opening 4a and a driving mechanism housing unit 4d protruding a rectangular shape at one corner part of the rotation member holding part 4c when the housing 4 is viewed from the out-of-face direction of the rotation member holding part 4c. The rotation member holding part 4c forms a square shape when viewed from its out-of-face direction. At each of four corners of the rotation member holding part 4c, a through hole is formed into which a screw N is inserted.

Figure 4:
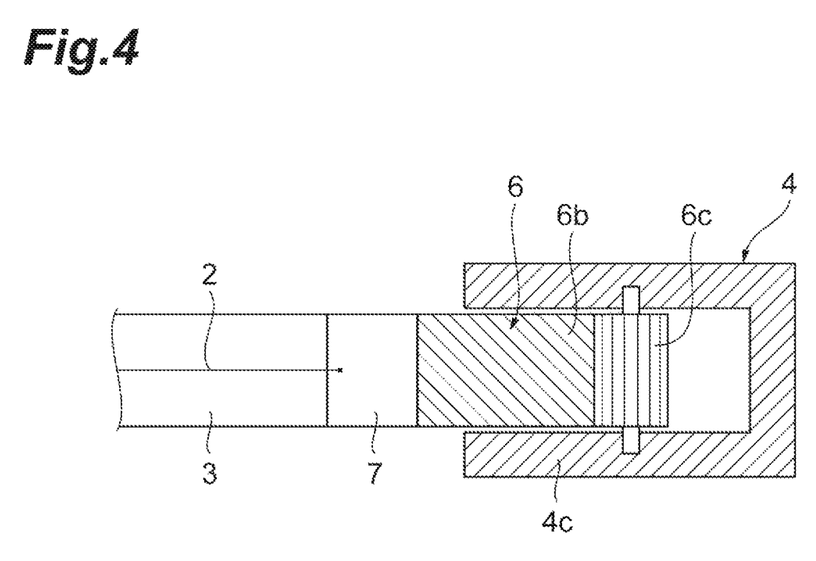
FIG. 4 is a cross sectional view showing the gear of the cleaning device in FIG. 1.

The screw N is inserted into each of the through holes and the screw N is screwed on the camera C side of the housing 4, and hence the cleaning device 1 is fixed to the camera C. The driving mechanism housing unit 4d protrudes in a rectangular cuboid shape from one corner part of the rotation member holding part 4c. As shown in FIGS. 3 and 4, in the inside of the driving mechanism housing unit 4d, the motor 5 and the gear group 6 are housed.

The gear group 6 includes a first gear 6a configured to rotate together with the drive shaft of the motor 5, a second gear 6b in an annular shape configured to mesh with the first gear 6a, the second gear 6b rotating together with the rotation member 3, and a hearing 6c configured to mesh with the second gear 6b and rotatable on the housing 4. The bearing 6c is provided on the opposite side of the first gear 6a when viewed from the second gear 6b. The driving force of the motor 5 is transmitted to the rotation member 3 through the first gear 6a and the second gear 6b. The transmission of the driving force to the rotation member 3 rotates the rotation member 3. As described above, the motor 5 corresponds to a drive unit configured to rotate the rotation member 3.

The rotation member 3 holds the filamentary member 2, and rotates the filamentary member 2 such that the filamentary member 2 moves along the surface of the lens C1. The rotation member 3 is, for example, made of a resin material, such as PP (polypropylene) or ABS resin (a copolymerization synthetic resin of acrylonitrile·butadiene·styrene). The number of revolutions of the rotation member 3 is 120 rpm or more and 250 rpm or less, for example. However, the number of revolutions can be appropriately modified. The time of rotation of the rotation member 3 in cleaning of the lens C1 at one time is three seconds or more and five seconds or less, for example.

Figure 5:
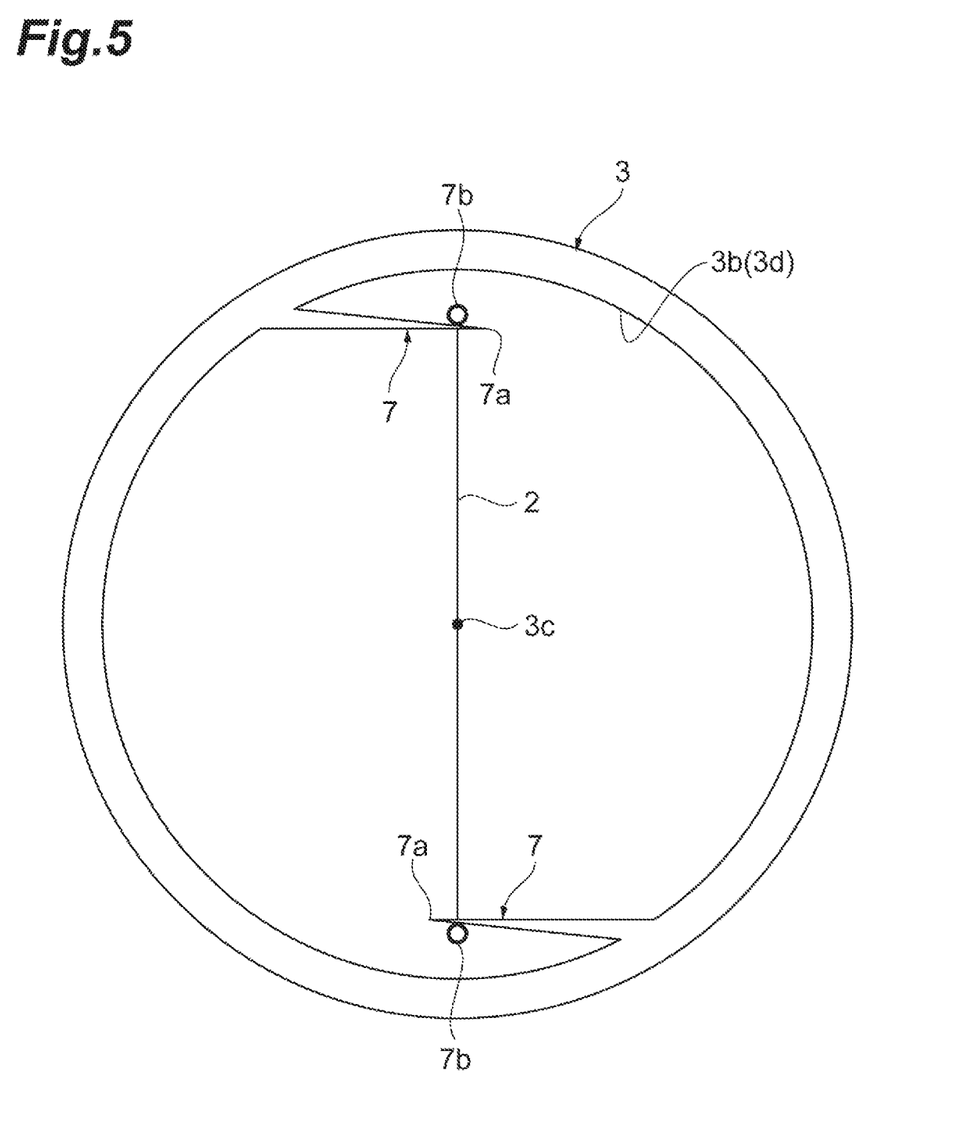
FIG. 5 is a plan view showing the filamentary member and the rotation member of the cleaning device in FIG. 1.

The rotation member 3 is provided on the opposite side (on the front side) of the lens C1 when viewed from the second gear 6b, for example. As shown in FIGS. 1 and 5, the rotation member 3 is in a ring shape. For example, the rotation member 3 has an opening 3b from which the lens C1 is exposed, and this opening 3b is in a circular shape. As described above, the rotation member 3 includes an elastic part 7 configured to hold the filamentary member 2. The elastic part 7 protrudes from an inner circumferential surface 3d of the rotation member 3 forming the opening 3b to the inner side of the opening 3b. The elastic part 7 is a resin spring member integrally formed with the rotation member 3, for example.

For example, two elastic parts 7 are disposed at positions in symmetry to the center 3c of the opening 3b. The elastic parts 7 protrude from the inner circumferential surface 3d such that the elastic parts 7 are along the inner circumferential surface 3d from the inner circumferential surface 3d. The elastic part 7 is gradually tapered toward the tip end portion 7a of the elastic part 7. The elastic part 7 is provided between the filamentary member 2 and the rotation member 3. At the tip end portion 7a of the elastic part 7, a fixing portion 7b fixed to the end portion of the filamentary member 2 is provided. Each of two end portions of the filamentary member 2 penetrates the tip end portion 7a, for example, and is fixed to the fixing portion 7b on the outer side of the tip end portion 7a in the radial direction.

When the cleaning device 1 is mounted on the camera C, the elastic part 7 is deformable corresponding to the shape of the lens C1 in a convex shape. Thus, even though the lens C1 in a convex shape contacts the filamentary member 2, the stress applied to the filamentary member 2 is relaxed. The filamentary member 2 contacts the lens C1 with the filamentary member 2 pulled by the fixing portion 7b of the elastic part 7. To the filamentary member 2, a tension load of 0.2 N or more and 1.5 N or less, for example, is imposed.

The filamentary member 2 linearly extends from one elastic part 7 to the other elastic part 7 of the above-described two elastic parts 7. For example, the two elastic parts 7 are disposed in symmetry to the center 3c, and hence the filamentary member 2 is disposed so as to pass the center 3c. The filamentary member 2 is a thread made of carbon fiber including fluorocarbon, for example. However, the filamentary member 2 may be a wire made of stainless steel. As described above, the material of the filamentary member 2 can be appropriately modified.

The thickness of the filamentary member 2 is 0.01 mm or more and 0.10 mm or less, for example, preferably 0.03 mm or more and 0.10 mm or less, and more preferably 0.03 mm or more and 0.06 mm or less. The color of the filamentary member 2 is black, for example. However, the color of the filamentary member 2 may be a color other than black, which does not easily reflect light, such as dark blue, purple, brown, gray, or dark green, and can be appropriately modified. The filamentary member 2 may be delustered.

Next, an exemplary cleaning method for cleaning the lens C1 of the camera C using the cleaning device 1 will be described. First, when a vehicle driver determines that an image captured by the camera C is not clear after seeing the monitor disposed in the inside of the vehicle, the vehicle driver manipulates a switch that operates the cleaning device 1. After the driver manipulates the switch, the motor 5 generates driving force, and the driving force of the motor 5 is transmitted to the rotation member 3 through the gear group 6.

After the driving force of the motor 5 is transmitted to the rotation member 3, the filamentary member 2 is rotated for three seconds or more and five seconds or less, for example, about the center 3c together with the rotation member 3. By the rotation, the filamentary member 2 scrapes deposits on the lens C1, and the cleaning of the lens C1 is completed. Note that the cleaning method for the lens C1 using the cleaning device 1 may be a method automatically performed. In this case, it is automatically detected that an image captured by the camera C is not clear, the motor 5 generates driving force with this automatic detection, and cleaning is performed similarly to the description above.

Next, the operation and effect of the cleaning device 1 according to the embodiment will be described in detail.

The cleaning device 1 includes the filamentary member 2 configured to contact the lens C1 of the camera C. The filamentary member 2 is rotated with the filamentary member 2 in contact with the lens C1, and hence the lens C1 is cleaned. Thus, the filamentary member 2 scrapes, for example, deposits for cleaning, and hence cleaning can be performed with the filamentary member 2 that is thin. Therefore, it can be restrained that the reflection of the filamentary member 2 is projected onto the image captured by the camera C. The filamentary member 2 is provided at the position displaced from the focal point of the lens C1 and hence it can be restrained that the filamentary member 2 is projected onto the image captured by the camera C.

Therefore, even during the use of the camera C and during driving the vehicle, cleaning can be performed. Thus, the timing of using the cleaning device 1 is not limited, and hence usability can be enhanced. In the cleaning device 1, the rotation member 3 rotates the filamentary member 2 to clean cleaning of the lens C1. Therefore, the filamentary member 2 can be easily rotated at high speed, compared with the case in which a wiper blade or any other member is rocked. Consequently, deposits on the lens C1 can be efficiently scraped by a high-speed rotation of the filamentary member 2. Thus, the cleaning of the lens C1 can be efficiently performed.

The rotation member 3 is in a ring shape, and the filamentary member 2 is held on the rotation member 3. The cleaning device 1 includes the motor 5 configured to rotate the rotation member 3. Therefore, the rotation member 3 is rotated by the motor 5, and hence the filamentary member 2 held on the rotation member 3 can be rotated on a lens R1. Thus, the filamentary member 2 is rotated by the driving force of the motor 5, and hence the surface of the lens C1 can be cleaned.

The thickness of the filamentary member 2 is 0.01 mm or more and 0.10 mm or less. The thickness of the filamentary member 2 is 0.10 mm or less, and hence the filamentary member 2 can be made thin. Thus, the reflection of the filamentary member 2 can be further not easily projected onto an image captured by the camera C. The thickness of the filamentary member 2 is 0.01 mm or more, and hence the filamentary member 2 can be not easily cut. Thus, the strength of the filamentary member 2 can be surely secured.

The cleaning device 1 includes the elastic part 7 provided between the filamentary member 2 and the rotation member 3. The filamentary member 2 is connected to the rotation member 3 through the elastic part 7. Thus, in the case in which the lens C1 is curved in a convex shape, the filamentary member 2 can be brought into contact with the lens C1 by deforming the elastic part 7.

As described above, the elastic part 7 can be deformed when the filamentary member 2 is brought into contact with the lens C1, and hence it is enabled that the force applied to the filamentary member 2 is reduced to restrain cutting the filamentary member 2. Therefore, cutting the filamentary member 2 can be avoided even though the filamentary member 2 is disposed on the lenses C1 in various shapes, and hence the versatility of the cleaning device 1 can be enhanced. In the embodiment, the elastic part 7 is integrally formed with the rotation member 3, and hence an increase in the number of parts can be restrained.

The filamentary member 2 and the rotation member 3 are attachable to and detachable from the lens C1. Thus, the filamentary member 2 and the rotation member 3 can be replaced from the lens C1. Therefore, the maintenance properties of the cleaning device 1 can be enhanced.

The filamentary member 2 is black. Thus, the light reflection from the filamentary member 2 can be restrained. Therefore, a problem that an image captured by the camera C is not clear due to reflected light beams from the filamentary member 2 can be restrained.

The filamentary member 2 is made of carbon fiber. Therefore, the filamentary member 2 can be made strong as well as can be made lightweight. Carbon fiber has elasticity and flexibility, and hence the abrasion of the filamentary member 2 with cleaning can be restrained.

The number of revolutions of the rotation member 3 is 120 rpm or more. Thus, deposits, such as water, attached to the lens C1 can be surely removed by the centrifugal force of rotation. Therefore, the cleaning properties of the filamentary member 2 to the lens C1 can be further enhanced.

The filamentary member 2 contacts the lens C1 with the filamentary member 2 pulled, and the tension load of the filamentary member 2 is 0.2 N or more and 1.5 N or less. The tension load of the filamentary member 2 is 0.2 N or more, and hence it is enabled that the pressing force of the filamentary member 2 against the lens C1 is increased to further efficiently scrape deposits on the lens C1. The tension load of the filamentary member 2 is 1.5 N or less, and hence the abrasion of the filamentary member 2 can be restrained.

The filamentary member 2 is provided at the position displaced from the focal point of the lens C1. Therefore, the filamentary member 2 is disposed at the position displaced from the focal point of the lens C1, and hence it can be further surely avoided that the reflection of the filamentary member 2 is projected onto an image captured by the camera C.

Second Embodiment

Next, referring to FIGS. 6 to 9, a cleaning device 11 according to a second embodiment will be described. The cleaning device 11 is different from the first embodiment in that a water stream W is used as a rotation drive unit instead of the motor 5 and the gear group 6 and the cleaning device 11 includes a rotation member 13 and a housing 14 in shapes different from the rotation member 3 and the housing 4. In the following, the duplicate description of the first embodiment is appropriately omitted.

Figure 6:
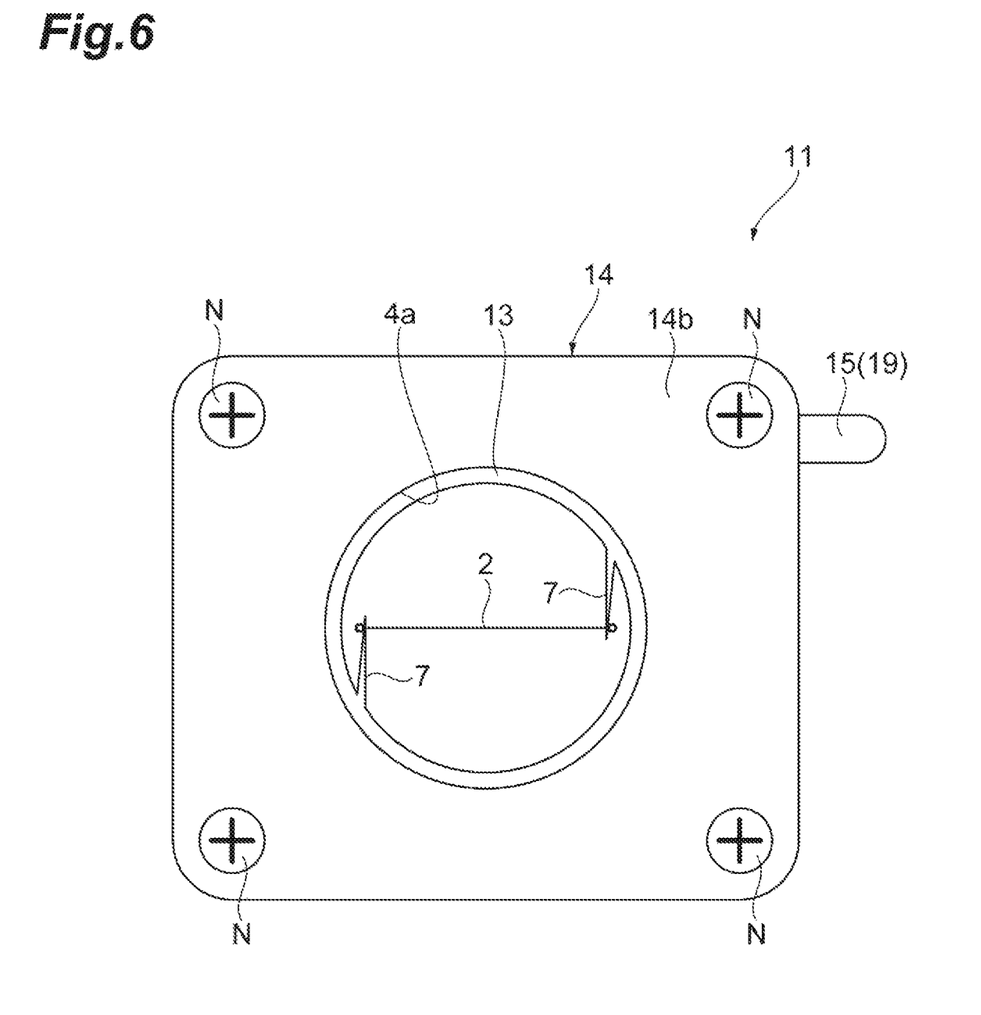
FIG. 6 is a plan view showing a cleaning device according to a second embodiment.
Figure 7:
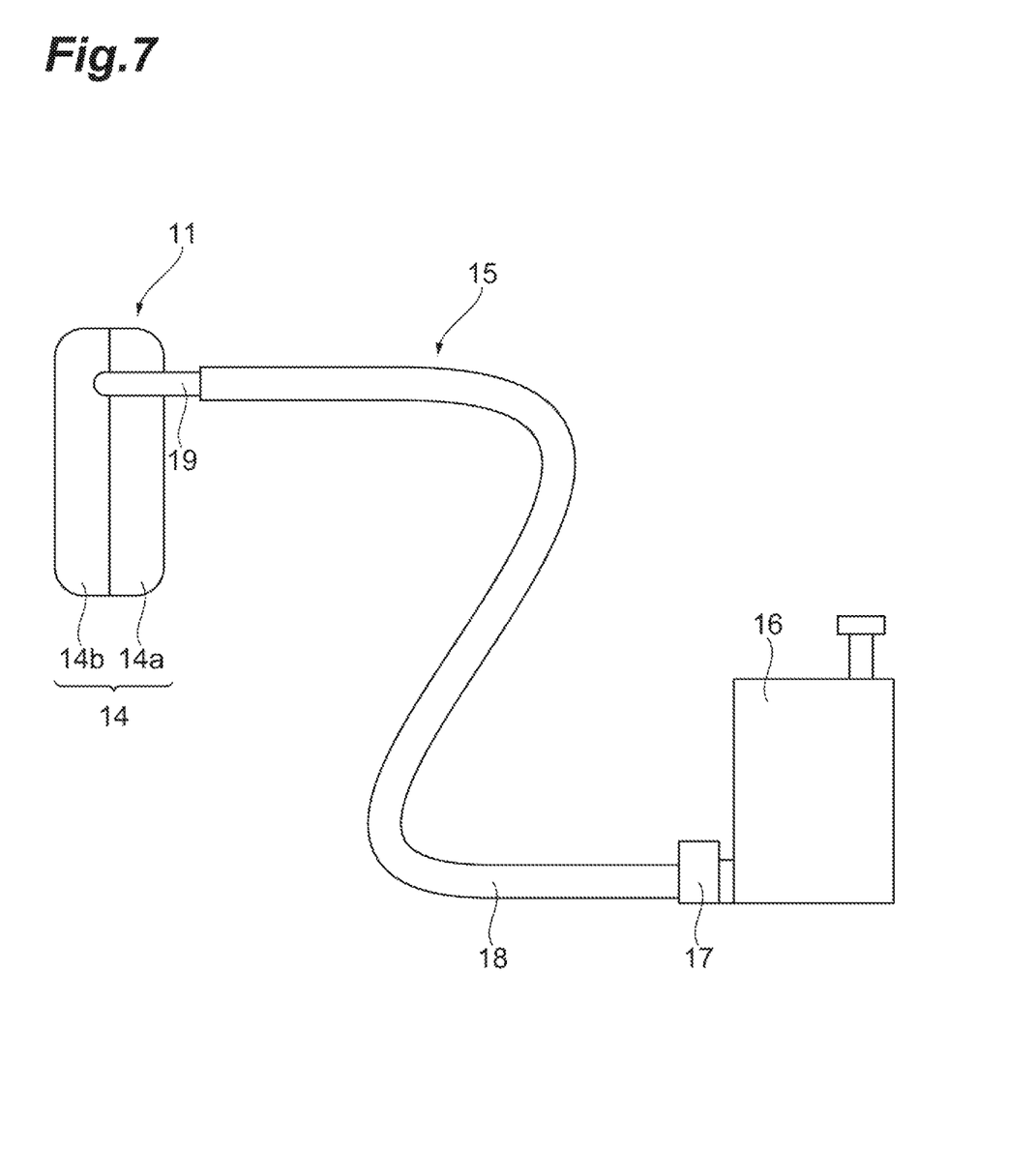
FIG. 7 is a conceptual diagram of the water supply unit of the cleaning device in FIG. 6.

As shown in FIGS. 6 and 7, the cleaning device 11 includes a water supply unit 15 configured to supply water to the inside of the housing 14. The water supply unit 15 includes, for example, a washer tank 16, a washer pump 17, a pipe 18, and a water introduction unit 19. The washer tank 16 stores water (water including a washer fluid).

The washer pump 17 is provided on the outlet side of the washer tank 16. The washer tank 16 is connected to the housing 14 through the washer pump 17, the pipe 18, and the water introduction unit 19. The washer pump 17 is operated by manipulations by a driver on a vehicle. That is, after the washer pump 17 is manipulated by the driver, the washer pump 17 supplies water in the washer tank 16 to the inside of the housing 14 through the pipe 18 and the water introduction unit 19. Note that the washer pump 17 may be automatically operated when an image captured by the camera C is not clear.

Figure 8:
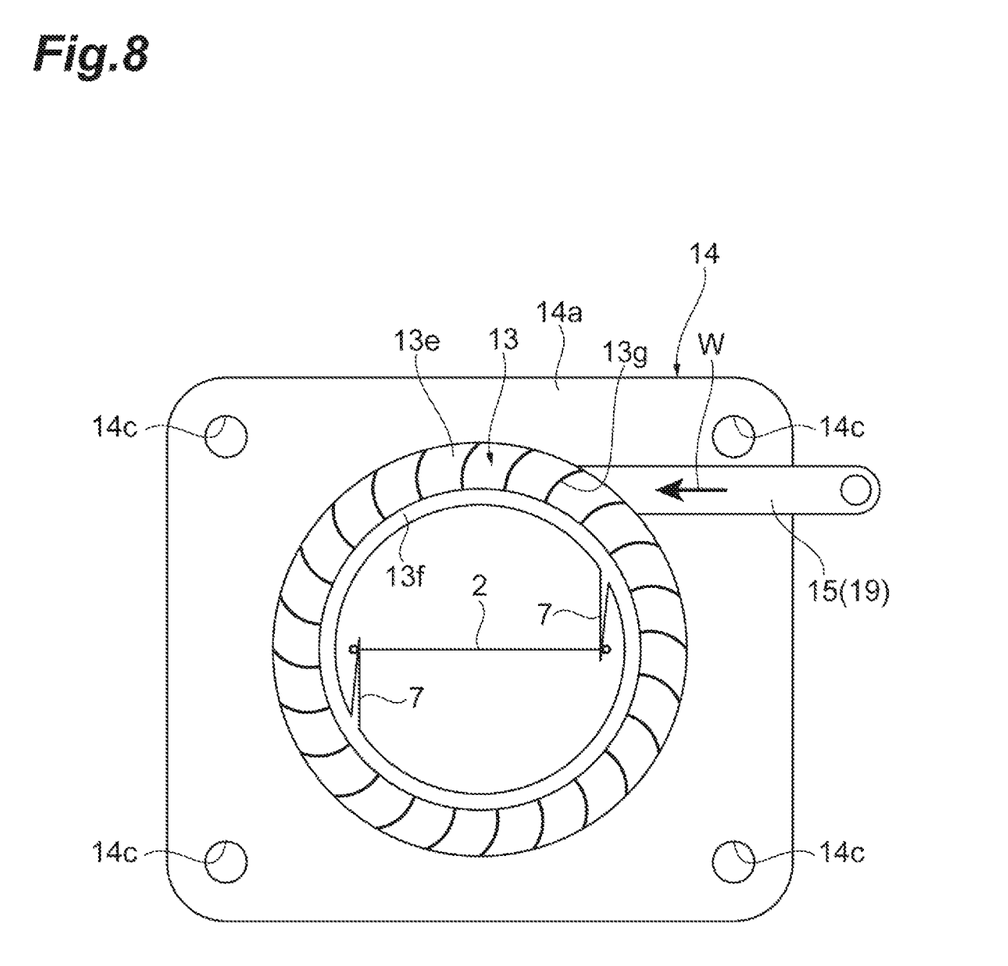
FIG. 8 is a plan view showing the rotation member and the filamentary member of the cleaning device in FIG. 6.

As shown in FIGS. 6 and 8, the housing 14 forms a rounded rectangle. The housing 14 has a main body part 14a on which the rotation member 13 is placed and a lid part 14b covering a part of the rotation member 13 placed on the main body part 14a. Both of the main body part 14a and the lid part 14b are in a rectangle, and the main body part. 14a and the lid part 14b are joined to each other being laid on each other. The lid part 14b has an opening 4a from which a filamentary member 2 and the rotation member 13 are exposed.

The main body part 14a includes a through hole 14c into which a screw N is inserted at four corners of the main body part 14a. Also on the lid part 14b, a through hole is formed into which the screw N is inserted. The screw N is passed through the through hole of the lid part 14b and the through hole 14c, and screwed into the camera C side. Thus, the cleaning device 11 is fixed to the camera C with the main body part 14a and the lid part 14b joined to each other. The screw N is removed, and hence the housing 14 can be disjoined as well as the filamentary member 2 and the rotation member 13 can be removed from the camera C.

Figure 9:
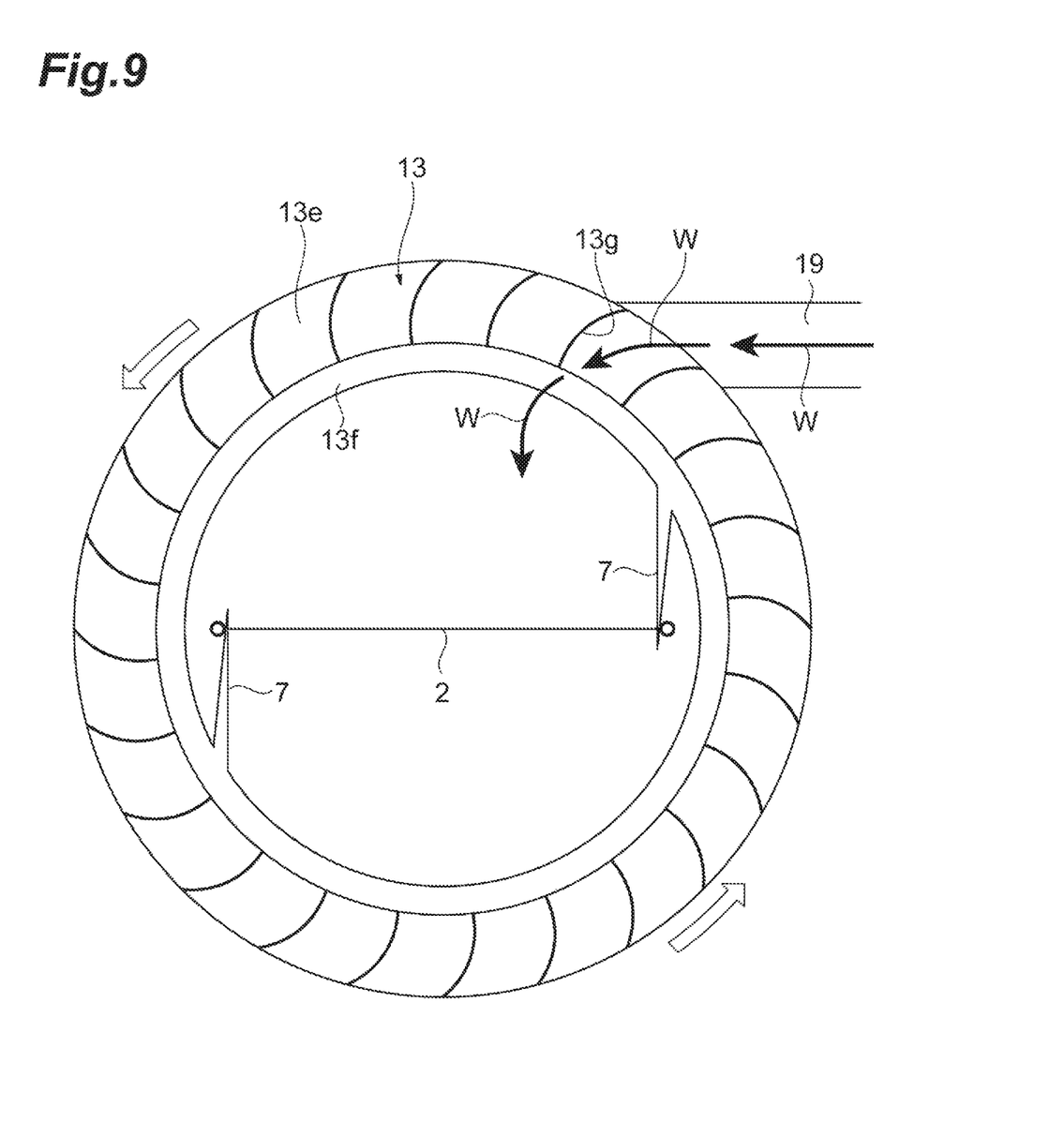
FIG. 9 is an expanded plan view of the rotation member and the filamentary member in FIG. 8.

As shown in FIGS. 8 and 9, the above-described water introduction unit 19 is connected to the rotation member 13 in the inside of the housing 14. The rotation member 13 includes a rotation part 13e in an annular shape rotated by reception of the water stream W from the water introduction unit 19 and an interior part 13f located on the inner side of the rotation part 13e, the interior part 13f being provided with an elastic part 7.

The rotation part 13e includes a wall part 13g in a convex shape configured to receive the water stream W from the water introduction unit 19. The wall part 13g extends from the outer edge of the rotation part 13e along the water stream W from the water introduction unit 19, and forms a curved shape gradually curved to the inner side in the radial direction when viewed from the rotation member 13 in the out-of-face direction. As described above, the wall part 13g is in a shape receiving the water stream W on the inner side of the rotation member 13 in the radial direction.

The rotation member 13 includes a plurality of wall parts 13g. For example, the plurality of wall parts 13g is disposed at regular intervals along the circumferential direction of the rotation member 13. The number of the wall part 13g is 24, for example. That is, as an example, the wall parts 13g are disposed at a phase angle of 15°.

Next, a cleaning method for cleaning a lens C1 using the cleaning device 11 will be described. For example, similarly to the description above, after the vehicle driver manipulates a switch that operates the cleaning device 11, water is supplied from the washer tank 16 to the inside of the housing 14 by the washer pump 17.

After water is supplied to the inside of the housing 14, water contacts the wall parts 13g of the rotation member 13. The water in contact with the wall parts 13g rotates the rotation member 13. The water enters from the wall part 13g to the inner side of the rotation member 13, and reaches the lens C1. The water imparts the rotation driving force that rotates the rotation member 13 as well as the water is used as a cleaning fluid for the lens C1.

After the rotation member 13 is rotated by the water, the filamentary member 2 is rotated together with the rotation member 13. Thus, the filamentary member 2 scrapes deposits on the lens C1 to which the cleaning fluid is supplied, and hence even dried, caked deposits are further surely removed.

After the rotation member 13 is rotated with the water and a certain time period elapses, the supply of the water to the rotation member 13 is stopped. After the supply of the water is stopped, the rotation member 13 is further rotated for about three seconds to five seconds by inertia. As described above, the rotation member 13 is further rotated after the supply of the water is stopped, and hence remaining water can be removed from the lens C1.

As described above, in the cleaning device 11 according to the second embodiment, the rotation member 13 rotates the filamentary member 2 by reception of the water stream W. As described above, the filamentary member 2 is rotated with the water stream W, and hence the driving mechanisms, such as the motor and the gear group, configured to rotate the filamentary member 2 can be eliminated as well as a water-proof unit for the motor and the gear group is also eliminated. Therefore, the cleaning device 11 can made lightweight as well as the configuration of the cleaning device 11 can be simplified. Specifically, the driving mechanism housing unit configured to house the driving mechanisms, such as the motor and the gear group, is eliminated. As a result, the housing 14 can be formed in a simple shape like a rectangle, for example.

As described above, the embodiments are described. However, the present disclosure is not limited to the foregoing embodiments, and may be ones modified in the scope that does not change the gist described in claims or ones adapted to another form. That is, the present disclosure can be variously modified within the scope not deviating from the gist of claims.

Figure 10:
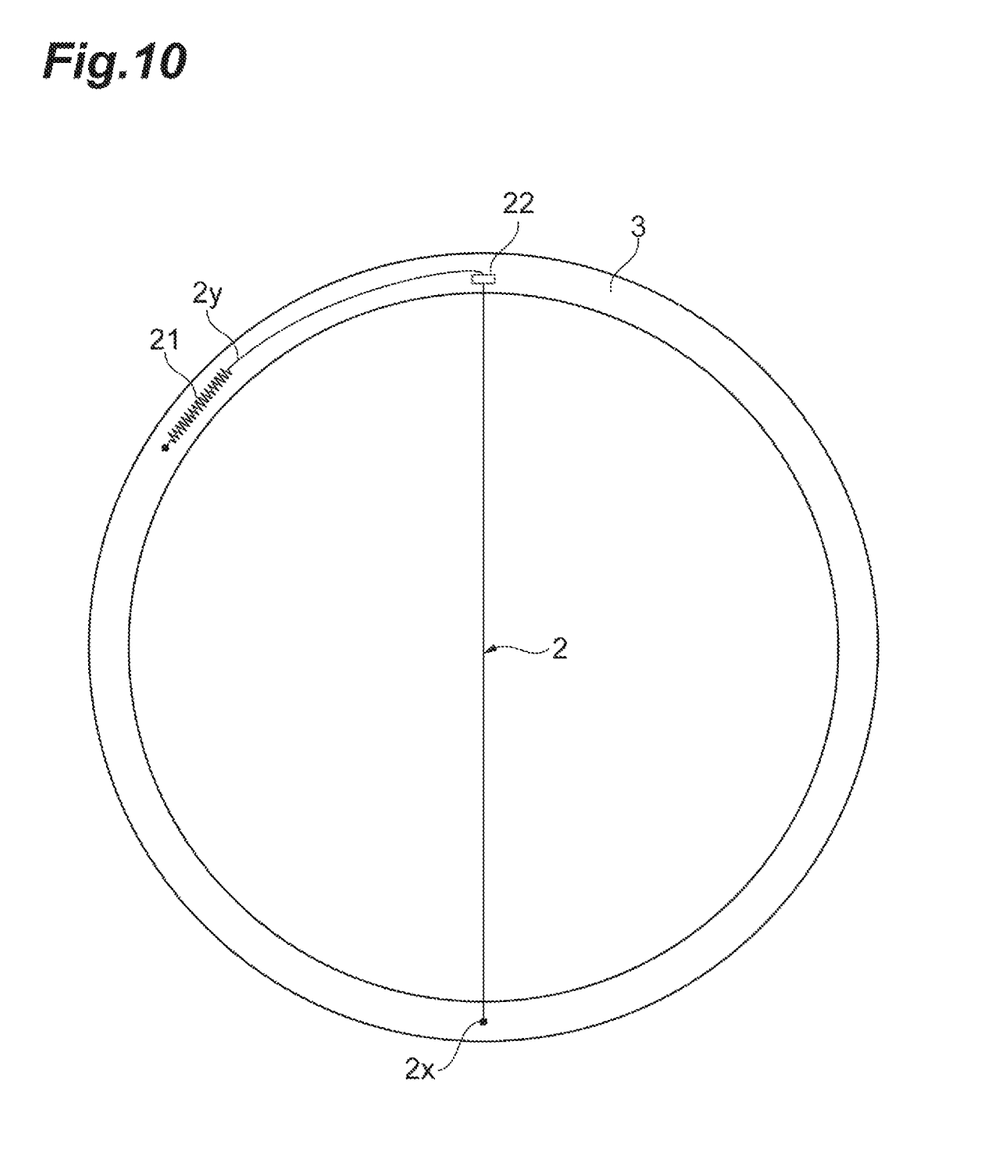
FIG. 10 is a plan view showing the elastic part of a cleaning device according to an exemplary modification.

For example, in the foregoing embodiments, the elastic part 7 formed integrally with the rotation member 3 is described. The shape, size, material, number, and disposition form of the elastic part 7 can be appropriately modified. The elastic part. 7 can also be omitted in some cases. The cleaning device may include an elastic part separate from the rotation member 3. For example, as shown in FIG. 10, the cleaning device may include a spring 21 extending in the circumferential direction of the rotation member 3 as an elastic part.

In this case, one end 2x of the filamentary member 2 is fixed to the rotation member 3, and another end 2y of the filamentary member 2 is coupled to the spring 21. The other end 2y side of the filamentary member 2 is the rotation member 3 is held on the holding member 22, and the direction is changed to the circumferential direction of the rotation member 3. The other end 2y ahead of the changed direction is fixed to the rotation member 3 through the spring 21. Thus, the spring 21 extends when the filamentary member 2 contacts the lens C1, and hence the force imposed to the filamentary member 2 can be relaxed. Therefore, the event that the filamentary member 2 is cut can be avoided.

In the foregoing embodiments, the filamentary member 2 that is black and made of carbon fiber and the rotation member 3 made of a resin are described. However, the material, number, color, and size of the filamentary member can be appropriately modified. The material, shape, and size of the rotation member can be appropriately modified. The number, shape, size, and disposition form of the wall part 13g of the rotation member 13 according to the second embodiment can also be appropriately modified.

The housing of the cleaning device can also be appropriately modified not limited to the shapes of the above-described housings 4 and 14. In the foregoing, embodiments, the cleaning device 1 is fixed to the camera C by fixing the housing 4 with the screw N. However, the fixing unit of the cleaning device may be a unit not using the screw N, such as a fitting structure.

In the foregoing second embodiment, an example is described in which the cleaning device 11 includes the water supply unit 15 and the filamentary member 2 is rotated with the water stream W. However, the cleaning device 1 according to the first embodiment may include the water supply unit 15. A water supply unit configured to supply water from a place other than the washer tank 16, not limited to the water supply unit 15 including the washer tank 16, the washer pump 17, the pipe 18, and the water introduction unit 19. As described above, the configuration, shape, number, and disposition form of the water supply unit can be appropriately modified.

In the foregoing embodiments, the cleaning device 1 configured to clean the lens C1 of the camera C provided on the vehicle is described. However, the cleaning device according to the present disclosure may be one configured to clean another light transmission member, such as a camera filter. The cleaning device according to the present disclosure may be a cleaning device that cleans the lens of a surveillance camera, for example, and the configuration, use, and form of cameras are not specifically limited. The cleaning device according to the present disclosure is applicable to various cameras.

INDUSTRIAL APPLICABILITY

According to the present disclosure, a problem that a captured image is not seen in cleaning is avoided to enhance usability as well as cleaning can be efficiently performed.

REFERENCE SIGNS LIST 1, 11 Cleaning device
2 Filamentary member
3, 13 Rotation member
7 Elastic part
21 Spring (elastic part)
C Camera
C1 Lens (light transmission member)
W Water stream

The invention claimed is:

1. A cleaning device that cleans a light transmission member provided on a camera, the cleaning device comprising:
   a filament configured to contact the light transmission member;
   a rotator having a ring shape and configured to rotate the filament about a center of the rotator such that the filament moves along a surface of the light transmission member with the filament in contact with the light transmission member; and
   opposing elastic parts having base ends integrally formed with the rotator such that the opposing elastic parts rotate together with rotation of the rotator and the base ends of the opposing elastic parts are stationarily fixed relative to the rotator, and wherein
   the filament is fixed to the opposing elastic parts to rotate with the rotation of the rotator.

2. The cleaning device according to claim 1, wherein the cleaning device includes a driver configured to rotate the rotator.

3. The cleaning device according to claim 1, wherein the rotator rotates by reception of a water stream.

4. The cleaning device according to claim 1, wherein a thickness of the filament member is 0.01 mm or more and 0.10 mm or less.

5. The cleaning device according to claim 1, wherein the rotator is attachable to and detachable from the light transmission member.

6. The cleaning device according to claim 1, wherein the filament is black.

7. The cleaning device according to claim 1, wherein the filament contacts the light transmission member with the filament pulled, and
the tension load of the filament is 0.2 N or more and 1.5 N or less.

8. The cleaning device according to claim 1, wherein the filament is provided at a position displaced from a focal point of the light transmission member.

9. The cleaning device according to claim 2, wherein a thickness of the filament is 0.01 mm or more and 0.10 mm or less.

10. The cleaning device according to claim 2, wherein the rotator is attachable to and detachable from the light transmission member.

11. The cleaning device according to claim 2, wherein the filament is black.

12. The cleaning device according to claim 2, wherein the filament contacts the light transmission member with the filament pulled, and
the tension load of the filament is 0.2 N or more and 1.5 N or less.

13. The cleaning device according to claim 2, wherein the filament is provided at a position displaced from a focal point of the light transmission member.

14. The cleaning device according to claim 3, wherein a thickness of the filament is 0.01 mm or more and 0.10 mm or less.

15. The cleaning device according to claim 3, wherein the filament is black.

16. The cleaning device according to claim 3, wherein the filament contacts the light transmission member with the filament pulled, and
the tension load of the filament is 0.2 N or more and 1.5 N or less.

17. The cleaning device according to claim 3, wherein the filament is provided at a position displaced from a focal point of the light transmission member.

18. The cleaning device according to claim 1, wherein the ring shape of the rotator has an inner circumferential surface that defines an opening, wherein the opposing elastic parts protrude from the inner circumferential surface of the rotator to an area of the opening.

19. The cleaning device according to claim 18, wherein the opposing elastic parts are positioned symmetrically with respect to a center of the opening.

20. The cleaning device according to claim 1, wherein the opposing elastic parts are resin spring members.

* * * * *